M. S. SWANSTROM.
WINDMILL.
APPLICATION FILED MAY 17, 1909.

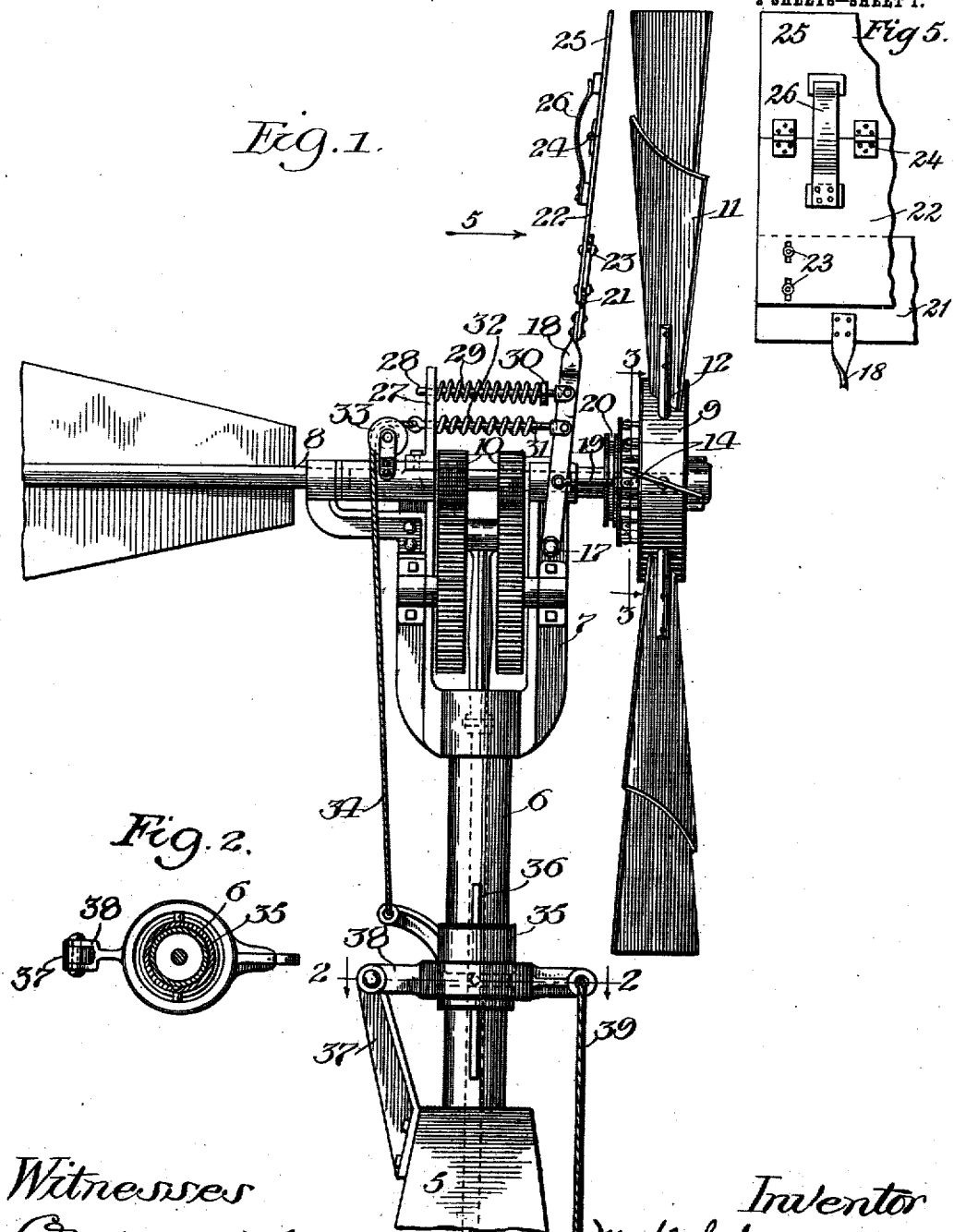

963,335.

Patented July 5, 1910.
2 SHEETS—SHEET 2.

Witnesses

Inventor
Martin S. Swanstrom
by Casper L. Redfield
Atty.

UNITED STATES PATENT OFFICE.

MARTIN S. SWANSTROM, OF CHICAGO, ILLINOIS.

WINDMILL.

963,335.   Specification of Letters Patent.   Patented July 5, 1910.

Application filed May 17, 1909. Serial No. 496,360.

*To all whom it may concern:*

Be it known that I, MARTIN S. SWANSTROM, a citizen of the United States of America, and a resident of Chicago, county of Cook, and State of Illinois, have invented certain new and useful Improvements in Windmills, of which the following is a specification.

My invention relates to wind mills and has for its objects improvements in such devices.

Figure 4:
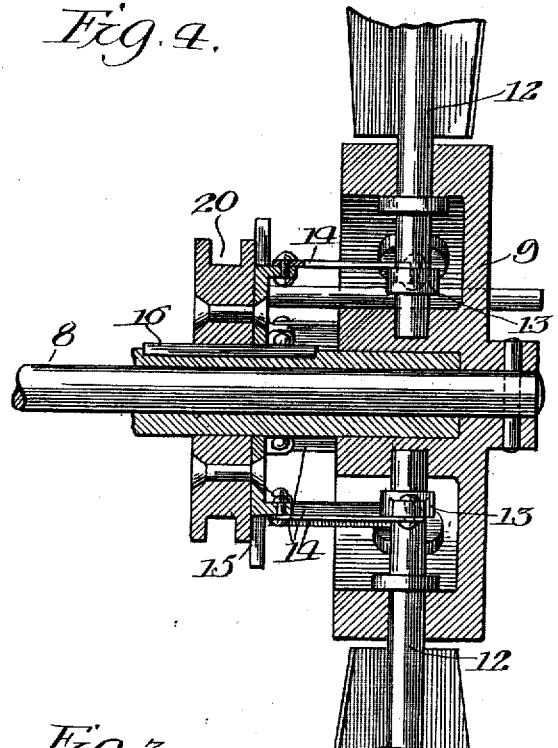
Figure 3:
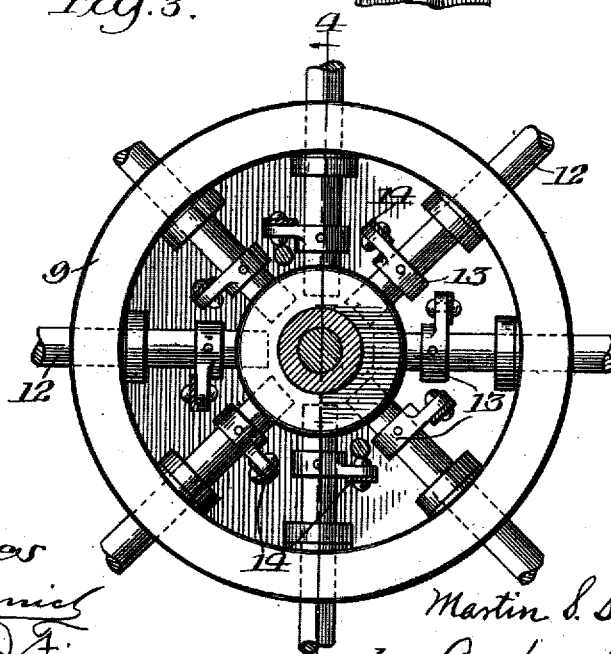

In the accompanying drawings, Figure 1 is an elevation of a wind mill and the upper part of its support, some portions of said figure being in section; Fig. 2 is a section on line 2—2 of Fig. 1; Fig. 3 is a section on line 3—3 of Fig. 1; Fig. 4 is a section on line 4—4 of Fig. 3, and Fig. 5 is a partial elevation in the direction 5 of Fig. 1.

In the said drawings, 5 is the upper part of a tower on which is pivoted a standard 6. The upper part of the standard 6 is in the form of a fork 7 in which is carried a shaft 8 having a wind-wheel hub 9 pinned on one end. Gears 10 on the shaft 8 serve to convey power from the shaft in the ordinary manner to any place at which it is to be used.

The sails 11 of the wind-wheel are secured to pivoted rods 12 which are supported by the hub 9. On each pivoted rod 12 is secured an arm 13 to which is pivoted a link 14. The various links 14 are in turn connected at their other ends to a sliding collar 15 mounted either upon a projection of the hub 9 or upon the shaft 8, as may be most convenient. The collar 15 slides on a feather 16, which causes the said collar to rotate with the hub 9.

Pivoted at a convenient point on the fork 7, or any part of the standard 6 as at 17, is an arm 18 which is provided with links 19 adapted to engage the groove 20 of the collar 15. These links 19 are in essence a fork engaging the collar for moving it longitudinally on the shaft 8. On the upper end of the arm 18 is a flat surface 21 against which the wind strikes and presses when the wheel is in operation facing the wind in the ordinary manner. Secured to this flat surface 21 is another flat surface 22; the two parts 21 and 22 being slotted and held together by bolts 23, as shown in Fig. 1. The result of this construction is that the flat surface 22 may be elevated or lowered, as desired, so as to increase or diminish the area exposed to wind pressure on the upper end of the arm 18. Hinges 24 secured on the upper edges of the plate or surface 22 serve as a means for providing a still greater surface 25 against which wind may also strike tending to press over the arm 18. A spring 26 normally holds the plate or surface 25 in line with the plate or surface 22, but under considerable wind pressure the spring 26 will yield permitting the plate or surface 25 to bend backward, thus relieving the strain on the arm 18 due to a high velocity of wind.

Supported at a convenient point on the fork 7 and back of the arm 18 is a bracket 27. Secured to the arm 18 is a rod 28 which extends through an opening in the bracket 27. Surrounding this rod 28 is a spring 29, and on the rod is a nut 30 for adjusting the tension of the said spring. These parts serve to push the arm toward the right and hold it in its normal position, which is the position shown in Fig. 1. When the wind, pressing against these surfaces supported by the arm 18, pushes that arm to the left or away from the wind-wheel itself, the action is to compress the spring 29, and the amount of movement will depend upon the wind pressure and also upon the tension of the said spring. In such a movement of the arm 18 the links 19 draw the collar 15 to the left and the movement of this collar communicated through the links 14 and arms 13 turn the rods 12 in their bearings in hub 9, and, as a consequence, turn the sails 11 correspondingly. By proper adjustment any given wind pressure can be made to turn these sails any given amount. Also secured to the arm 18 is another rod 31, which also passes through an opening in the bracket 27. On this last rod is another spring 32 which is stiffer or stronger than the spring 29 and is somewhat shorter, so that it is not engaged until the arm 18 has moved to near the limit of its movement to the left. The object of this last spring is to prevent a too great movement, and the consequent too great shifting of the sails unless the wind pressure becomes very extreme, in which case the spring 32 will also yield.

Supported in a convenient bracket on the fork 7 is a small wheel 33 over which a cord 34 passes, one end of which is secured to an eye in the rod 31, and the other end of which is secured to a sliding sleeve 35. This sleeve 35 rotates with the standard 6 when said standard turns to cause the wheel to accommodate itself to any particular direction of wind. The means of causing the sleeve 35 and standard 6 to move together, while permitting the sleeve to slide, is illustrated as being a feather 36 in the standard 6.

Secured on the top of the tower 5 is a bracket 37 to which is pivoted a fork 38 adapted to engage a groove in the sleeve 35. On the free end of the fork 38 is a cord or rope 39 which extends down through the tower in a convenient position to be seized by a person and the sleeve moved downward on the standard 6 by hand pressure. The result of such action would be to draw the cord 34 downward, which being attached to the rod 31 draws that and the arm 18 to the left or toward the rear of the wind mill. As the arm 18 is connected through to the pivoting rods of the sails 11, it will be seen that the rope or wire cable 39 provides a means by which the sails may be turned on their pivots far enough to throw them out of operation by the wind, and that by securing the said rope to any fixed point on the tower the sails may be held in that position irrespective of the turning of the standard 6 on its pivot in the tower 5.

What I claim is:

1. The combination with a wind-wheel having adjustable sails, of a movable device independently operated by wind pressure, a spring for yieldingly resisting the movement of said device under pressure, a second resisting spring adapted to be brought into action whenever said device moves more than a predetermined amount, and connections from said device to said wheel for adjusting the sails thereof.

2. In a wind mill, the combination of a wind wheel comprising a series of pivoted sails, a pivoted wind-actuated arm consisting of a main section and a yielding section, a spring for yieldingly resisting the movement of said arm, a second spring brought into action when the arm has moved a predetermined amount, and connections from said arm to the sails for adjusting them on their pivots.

3. The combination with a wind wheel having adjustable sails, of a pivotally supported controlling vane consisting of a main section and a yielding section hinged to the main section, and a normally inactive resisting spring adapted to be engaged when said vane has moved a predetermined distance from its normal position.

Signed at Chicago, Ill. this 14th day of May 1909.

MARTIN S. SWANSTROM.

Witnesses:
WALTER H. REDFIELD,
CARRIE E. JORDAN.